United States Patent [19]

Broding

[11] Patent Number: 4,829,486
[45] Date of Patent: * May 9, 1989

[54] TRANSMITTING MULTIPLE BOREHOLE PARAMETERS IN SONIC LOGGING

[75] Inventor: Robert A. Broding, Tulsa, Okla.

[73] Assignee: Standard Oil Company (Indiana), Chicago, Ill.

[*] Notice: The portion of the term of this patent subsequent to Jun. 18, 2002 has been disclaimed.

[21] Appl. No.: 524,498

[22] Filed: Aug. 18, 1983

Related U.S. Application Data

[63] Continuation of Ser. No. 242,220, Mar. 10, 1981, abandoned.

[51] Int. Cl.[4] .............................................. G01V 1/40
[52] U.S. Cl. ........................................ 367/25; 367/27; 367/28; 367/35; 367/86; 181/105
[58] Field of Search .................. 181/104, 105; 367/11, 367/28, 29, 32, 34, 35, 69, 71, 78, 79, 80, 86, 101, 27, 30; 340/858, 861; 73/157

[56] References Cited

U.S. PATENT DOCUMENTS

| | | | |
|---|---|---|---|
| 2,595,241 | 5/1952 | Goble | 367/104 |
| 2,648,056 | 8/1953 | Jakosky | 367/27 |
| 3,175,639 | 3/1965 | Liben | 367/35 |
| 3,237,153 | 2/1966 | Blizard | 340/861 |
| 3,378,097 | 4/1968 | Straus et al. | 367/86 |
| 3,406,780 | 10/1968 | Zemanek, Jr. | 181/104 |
| 3,426,865 | 2/1969 | Henry | 364/900 |
| 3,454,922 | 7/1969 | Dory | 367/98 |
| 3,728,672 | 4/1973 | Dennis et al. | 367/69 |
| 3,732,947 | 5/1973 | Moran et al. | 367/28 |
| 3,959,767 | 5/1976 | Smither et al. | 340/858 |
| 4,223,398 | 9/1980 | Blalock | 367/26 |
| 4,283,953 | 8/1981 | Plona | 367/86 |
| 4,303,994 | 12/1981 | Tanguy | 365/35 |
| 4,414,651 | 11/1983 | Buckner | 367/28 |
| 4,524,433 | 6/1985 | Broding | 367/27 |

FOREIGN PATENT DOCUMENTS

| | | |
|---|---|---|
| 1172385 | 11/1969 | United Kingdom . |
| 1390998 | 4/1975 | United Kingdom . |
| 1474741 | 5/1977 | United Kingdom . |
| 1495279 | 12/1977 | United Kingdom . |
| 2020023 | 11/1979 | United Kingdom . |
| 2043898 | 10/1980 | United Kingdom . |

Primary Examiner—Thomas H. Tarcza
Assistant Examiner—Daniel T. Pihulic

[57] ABSTRACT

In an acoustic logging system for providing information regarding selected parameters of the wall of a borehole in the earth, and of the rock formation which is adjacent the borehole, in which a single transmit/receive transducer system (T/RTS) mounted on a rotating assembly probes the wall of the borehole in a circular scanning pattern as a function of depth, the improvement which includes at least a second T/RTS mounted on the rotating assembly in known geometrical relation to the first T/RTS, and means to process two or more analog electrical scan signals for transmission over one or more electrical transmission channels in a logging cable. In particular, methods and means are described for the transmission of multiple scan signals, whereby more bottom hole parameters are transmitted, including composite electrical scan signals, in which the early part provides a gated high frequency scan signal and the latter part, the gated flow frequency scan signal, for greater penetration into the rock. Also the simultaneous transmission of multiple pairs of digital measurements of amplitude and caliper, are multiplexed over a single analog transmission system.

4 Claims, 4 Drawing Sheets

TRANSMITTING MULTIPLE BOREHOLE PARAMETERS IN SONIC LOGGING

This is a continuation of copending application Ser. No. 242,220, filed Mar. 10, 1981 now abandoned.

CROSS-REFERENCE TO RELATED APPLICATIONS

This application is related to my co-pending application Ser. No. 242,497, filed Mar. 10, 1981, now U.S. Pat. No. 4,601,024, entitled: "BOREHOLE TELEVIEWER SYSTEM USING MULTIPLE TRANSDUCER SUBSYSTEMS" and Ser. No. 242,501, filed Mar. 10, 1981, abandoned, entitled: "HIGH SPEED SONIC LOGGING USING MULTIPLE TRANSDUCERS".

BACKGROUND OF THE INVENTION

1. Field of the Invention

This invention lies in the field of sonic logging systems for boreholes. More particularly, it is concerned with the logging of deep boreholes in the earth. Still more particularly, it concerns the use of a sonic transducer which transmit a beam of high frequency acoustic energy into the borehole wall directed in a radial plane, and receives the returned reflected acoustical energy signal from a reflecting surface, such as the wall of the borehole, and transmits a processed electrical scan signal derived from such received signal, to the surface of the earth, through the cable which supports the instrument, or sonde, for further processing.

Still more particularly, it concerns improvements in such logging devices, and in particular, the use of two or more transducer systems on a single rotating assembly so that multiple probing signals are sent outwardly from the axis of the borehole and multiple reflected sonic signals are received, converted to electrical scan signals, which are then utilized in various ways.

Still more particularly, this invention concerns improvements in methods and apparatus for processing multiple simultaneous analog electrical scan signals (ESS) in the sonde for transmission to the surface in real time, over conventional logging cables which may have only a single, or possibly only two conventional intermediate frequency signal transmission channels.

Still more particularly, this invention concerns improvements in such logging devices whereby with multiple transducers, the logging sonde can be traversed at higher speed without losing any detail of the sonic log.

2. Description of the Prior Art

This field of science and engineering is not new. It has been in useful operation in the logging of boreholes in the earth, such as oil and gas wells, for a number of years. There are various patents issued on selected features of these systems, and including the basic system, which form no part of this invention.

Examples of the prior art are illustrated by U.S. Pat. No. 3,369,626, entitled: "METHOD OF AND APPARATUS FOR PRODUCING A VISUAL RECORD OF PHYSICAL CONDITIONS OF MATERIALS TRAVERSED BY A BOREHOLE", issued Feb. 20, 1968 in the name of J. Zemanek, Jr. There is also U.S. Pat. No. 3,668,619, entitled: "THREE-DIMENSIONAL PRESENTATION OF BOREHOLE LOGGING DATA", patented June 6, 1972 in the name of Charles L. Dennis; U.S. Pat. No. 3,550,075, entitled: "SYSTEM FOR DISPLAYING TIME INFORMATION IN ACOUSTIC WELL LOGGING SYSTEM", issued Dec. 22, 1970 in the name of D. W. Hilchie et al; and U.S. Pat. No. 3,836,953, entitled: "ACOUSTIC CALIPER LOGGING", issued Sept. 17, 1974 in the name of Jerald C. Summers. There is also additional art recorded in the form of other patents, and in technical papers presented at technical society meetings, so that further description or statement of the art is not necessary at this time.

SUMMARY OF THE INVENTION

In my co-pending application, Ser. No. 242,497, filed Mar. 10, 1981, it was a primary object to provide a number of improvements in the design and construction of borehole logging instruments employing acoustical probing beams, and reflected sonic signals, and to provide at least two or more transmitter/receiver transducer systems (T/RTS) operating independently to provide multiple electrical scan signals, which are used cooperatively, in combination, to provide more information than would be possible by their separate use.

It is a primary objective of this invention to provide apparatus and methods for processing multiple ESS in a sonde for improved transmission over single or double transmission channels in conventional electrical logging cables.

It is a further object of this invention to transmit multiple independent parameters from the sonde over a single transmission channel.

In this invention the improvement lies in the apparatus and methods of processing and combining the analog electrical scan signals from two or more T/RTS. These are mounted on the same rotating assembly as the normal single T/RTS, in known geometrical relationships to each other. There may be two, three, four or more T/RTS and these each may have the same electrical characteristics or they may each be different from the others. By the use of different T/RTS, it is possible to probe into the earth to a deeper or shallower depth, depending upon the characteristic and the frequency of the T/RTS. For example, one of the problems of the conventional system is that it has a high frequency T/RTS, and high frequency sonic waves in the fluid in the well, such as drilling mud, suffer a high attenuation. Thus, the depth of penetration of the sonic beam is limited by this attenuation, due to the fact that the sonic waves must travel a selected distance through the mud, or other fluid in the well bore. By making the T/RTS of a lower frequency, the attenuation becomes less, and thus the sonic beam probes to a greater range, or radial distance from the transducer into the rock wall. With a plurality of similar transducers, arranged in a common plane transverse to the axis of the rotating assembly of the sonde, equally spaced circumferentially, a plurality of scans are made simultaneously, as the sonde is moved vertically at a selected constant rate. Thus, a shorter vertical spacing along the wall of the borehole is provided for each scan. This permits a much finer detail of scanning or probing. Conversely, it permits a higher rate of logging to get the same spacing of scan or probe traces. The arrangement of multiple T/RTS can be in a horizontal plane circumferentially spaced, or in a vertical plane longitudinally spaced. This use of arrays of T/RTS will provide a stronger, better-focused scanning beam, of higher energy. Thus, the penetration of the beam can be greatly increased. The basic problem is, however, how can these multiple ESS be transmitted to the surface by the use of logging cables which were originally designed for transmitting relatively low frequency electrical logging signals, and so on, that is, signals of less than about 50 KHZ. The apparatus and methods of processing the multiple ESS form the subject of this invention. The particular apparatus design depends on a number of factors, such as:

(a) the number of separate T/RTS and resulting ESS;
(b) whether the frequencies of the T/RTS are the same or different;
(c) whether the complete received signals are required, or simply measurements of amplitude of reflection, and time of travel, or depth of penetration, or caliper;
(d) whether selective portions of each of say two ESS can be gated to combine the two portions as a single signal;
(e) whether a single transmission channel is provided in the cable, or more parallel channels;
(f) the nature of the transmission channels, that is, their frequency pass bands; and so on.

BRIEF DESCRIPTION OF THE DRAWINGS

These and other objects and advantages of this invention and a better understanding of the principles and details of the invention will be evident from the following description taken in conjunction with the appended drawings, in which:

FIGS. 8A illustrates the comparable operation of a higher frequency versus a lower frequency T/RTS, while

DETAILED DESCRIPTION OF THE PREFERRED EMBODIMENT

Definitions

There are a number of words designating elements or parts of the invention that will be used frequently during the following description. I propose to define these in advance so that words may be saved in the description.

1. Sonde. This is a sealed logging instrument that contains the transducers and the control and power means for driving the transducers.

2. Rotating Assembly or Drum. This is the assembly in the sonde on which the transducers are mounted, and which rotates about the axis of the sonde.

3. Transmit/Receive Transducer Systems (T/RTS). These are the means to generate a sonic beam responsive to the application of a high voltage pulse to a transducer. In some instances the sonic generator can also be used as a sonic wave detector. In other instances, one of a pair of transducers is used as a detector.

4. Analog Electrical Scan Signal. This is the received sonic reflection of a transmitted sonic beam, which has been passed through a detector and converted to a unidirectional analog signal representative of the amplitude of the reflected signal as a function of time.

5. While the principal use of this sonde is in logging vertical boreholes in the earth, they can equally well be used in horizontal boreholes, etc. The proper word to use for indicating the position of two parts spaced along the axis is longitudinal, but the word vertical will be used when convenient.

Figure 1:
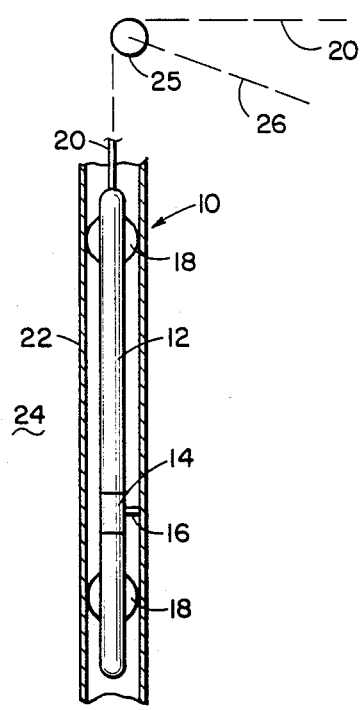
FIG. 1 illustrates the prior art simply in the arrangement of the longing sonde held concentric with the well bore my means of radial centering springs and supported by a cable which runs over a measuring wheel, the rotations of which are functions of depth.
Figure 2:
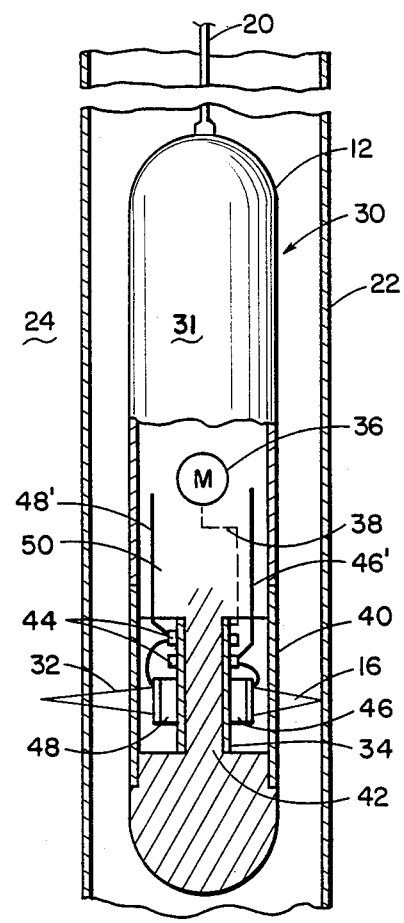
FIG. 2 illustrates one embodiment of this invention employing two T/RTS arranged 180° apart in a horizontal plane on the rotating assembly.
Figure 3:
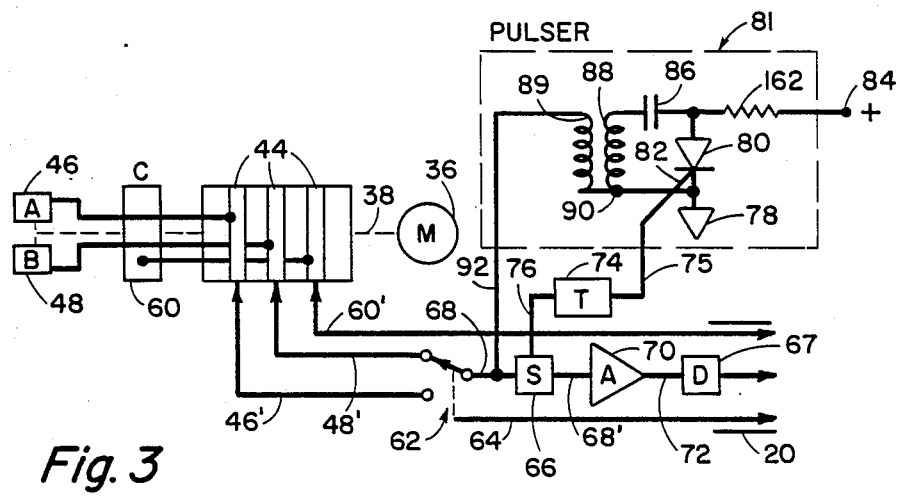
FIG. 3 illustrates one method of utilizing the two T/RTS of FIG. 2.

Refer now to the drawings and to FIGS. 1, 2, and 3, which are taken from my co-pending application, Ser. No. 242,501. FIG. 1 is indicated as prior art and is indicated generally by the numeral 10. A logging sonde 12 is supported in a vertical borehole 22 by means of a cable 20 shown passing around a measuring wheel 25 at the surface. The rotations of the wheel 25 measure the length of cable that has passed over the wheel. The rotations of the wheel 25 are transmitted by means 26, through an appropriate drive system, to control the movement in the direction representing verticality, in any display system that might be used. A section of the sonde indicated by numeral 14 rotates by motormeans in the sonde, at a selected constant rate. A probing beam of sonic energy 16 passes out radially from the rotating portion 14 to probe the wall and provide information regarding the character and the parameters of the wall 22, and the material of which the wall is composed. This wall might be a steel casing surrounded by cement in a drilled borehole in a rock formation, or it might be an open borehole.

Referring now to FIG. 2, there is shown, to a larger scale, a view of parts of a sonde, improved according to the teaching of this invention. Very little information will be provided regarding the normal electronic circuits in the space 31. These are fully described in many configurations in the patent literature referred to earlier. Wherever the circuitry would be different in this invention, it is of course, fully described as will be clearly seen in these figures.

The sonde 30 comprises an outer shell 12 of conventional construction. In the lower portion, a cylindrical bulkhead 50 is fastened rigidly and sealed to the outer shell and has a downwardly extending axial post 42. Bearings (not shown) are provided on the post 42, so that a cylindrical tube or sleeve 34 can be rotated about the post 42 by means shown as the dashed line 38, controlled by motor 36. Such a rotating sleeve, as indicated, is common to the prior art design.

On the sleeve 34 is mounted a first T/RTS 46 with its outer face tangential to the surface of revolution, as the sleeve 34 rotates. This T/RTS 46 is periodically excited by electrical circuits which will be described, and transmits radially outwardly a sonic beam indicated by the numeral 16, which passes to the wall 22 of the borehole, which may be cased or uncased. Part of the sonic energy is reflected backwardly to the T/RTS. The conducting outer surface of the T/RTS is connected to a slip ring 44. A brush or electrical contact, stationary in the sonde, contacts the slip ring as the sleeve rotates and transmits on the lead 46', the electrical scan signal reflected from the wall of the borehole. Rotary transformers can equally well be used in place of slip rings.

In the normal design of a borehole acoustic logger, or borehole televiewer (BHTV), only one such T/RTS 46 is provided, and the signal is collected from the slip ring 44 by the brush and passes by conductor 46' to circuits in the electronic package 31, which are conventional. The processed signal then passes up through a transmission channel in the cable 20, which is normally a pair of conductors, to the surface, where it is utilized.

In this invention, at least a second T/RTS is mounted on the rotating assembly comprising the sleeve 34, etc. It is energized in a manner similar to that of the T/RTS 46 and produces an electrical scan signal (ESS), which goes by means of the lead 48' to the electronic package in space 30 and to the surface in a manner similar to that of 46', as will be discussed in greater detail in connection with FIGS. 3, 5, etc. Various combinations of multiple T/RTS arranged in a common horizontal plane, equally spaced circumferentially, can be provided which will provide certain benefits. Also, the multiple T/RTS can be provided in a longitudinal array, whereby other benefits can be realized, or in some combination of circumferential and longitudinal arrays.

One possible electronic circuit that might be used with the apparatus of FIG. 2 is illustrated in FIG. 3. Here the two T/RTS 46 and 48, labelled A and B respectively, are rotated by the means 38, as previously described, by the motor 36. The rotating slip rings are shown as 44, three of them are shown, two of them are connected internally to the T/RTS 48 and 46 respectively, the third slip ring is connected to a compass unit 60, which is well known and provides a member which remains in a fixed azimuth as the sonde moves vertically in the hole. On each rotation of the rotating assembly 34, an electrical pulse signal is provided as a selected point on the rotating assembly passes the constant azimuth angle of the compass. This can be a magnetic compass, which might be useful in logging an open hole, or a gyro compass, or its equivalent, as would be well known in the art. By means of the signal received from 60 that passes internally to the slip ring, and by the collector to line 60', the orientation of the sonde with respect to an absolute azimuth such as north, can be determined. Thus, it can be represented on north/south or east/west displays, etc.

The manner in which the T/RTS are used to probe the wall of the borehole is old and well known, but is illustrated in FIG. 3 for completeness as to the electrical circuits in the upper right-hand portion of the FIG. 3. A power supply at 84 supplies power through resistor 162 to capacitor 86 that passes through the primary 88 of a transformer, and from junction 90 goes to a ground 78, which is connected to the negative potential of the power supply. A triggered rectifier, or gate control rectifier, 80 is connected between the potential 84 and the ground 78.

There is a timing means 74 which is conventional, operated by a clock of constant frequency, and including a counter means, such that at a selected time a signal pulse can be placed on line 75 to the trigger connection 82 of the controlled rectifier 80. When the trigger pulse arrives, the capacitor having been previously charged to the full potential of 84, now discharges through the rectifier 80 to the ground and this large current passing through the primary 88 of the transformer generates a corresponding voltage in the secondary 89 of the transformer, which goes by line 92 to the line 68, which can be connected to one or the other of the two T/RTS 46 or 48, as selected by the switch 62.

The switch 62 can be as simple as a relay, which is controlled by a potential on line 64; that is, controlled by means of a signal from the surface through one of the multiple conductors of the cable 20, as is well known in the art. Consider that the pulse of high voltage is delivered by line 92 to the line 48', which means it is delivered to the T/RTS 48 and the transmitter puts out a pulse of sonic energy of selected amplitude and frequency. This propagates outward radially through the mud in the annulus of the borehole (or liquid of selected composition), to an obstruction, such as the surface of the casing. Here, part of the sonic energy is reflected and passes backward over the same path to the T/RTS 48, where it generates a corresponding received signal, or electrical scan signal, which comes back from the T/RTS 48 through line 48', through the switch 62, to the box 66, which is marked S. Box 66 is a switch of a particular nature which is used for cutting off the receiving amplifier 70 from the line 68 during the period that the high voltage is on the line 92 to generate the transmitted sonic pulse.

The frequency of the transmitted sonic signal may be as high as 1 Meg. HZ, or higher, and far too high to transmit over the transmission channel of the conventional logging cable. It is, therefore, necessary to pass this through a signal detector 67, which converts the high frequency ESS to a relatively low frequency unidirectional analog signal, which can be transmitted over the cable. Thus, at a selected short time delay after the pulse is sent from line 92 to 48 and transmitted into the liquid, the connection from line 68 through the switch 66 and line 68' to the amplifier 70 is now connected, and the amplified reflected signal is passed by line 72, which is a high frequency transmission channel for transmitting the ESS through the cable to the surface. The timer 74 applies, through 76, the necessary gating potential to the switch 66. This can be as simple as an AND gate, which is open during the time that the potential is applied to 92, and is closed shortly after that potential disappears.

Figure 4:
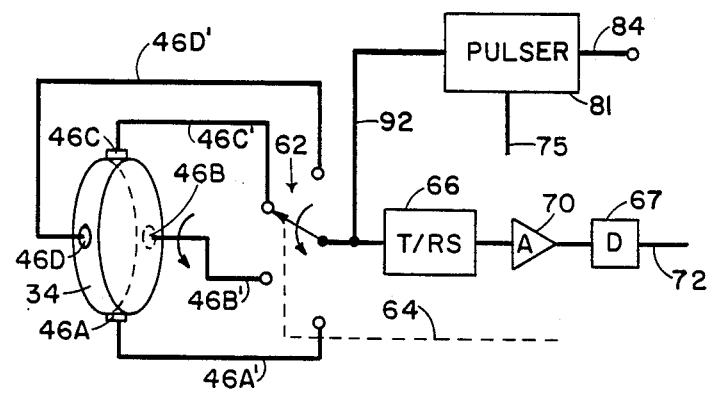
FIG. 4 is an extension of portions of FIGS. 2 and 3, illustrating how four separate T/RTS can be mounted on the rotating assembly and can be connected as desired to the pulser and to the cable.

Referring now to FIG. 4, here is shown schematically a rotating assembly 34, having four separate T/RTS 46A, 46B, 46C and 46D, instead of two as shown in FIGS. 2 and 3. These are arranged in the same transverse plane, perpendicular to the axis of rotation. Each one is connected by conductors 46A', 46B', 46C', 46D', to a multi-point switch 62' which is patterned after the switch 62 of FIG. 3, controlled by signal over dashed line 64. A pulser, identical in all respects to the pulser of FIG. 3 shown in the dashed box 81, has three terminals, one being provided with power 84, another providing the power output on lead 92, to transmit a sonic signal, and a third lead 75, which provides a timing signal to the pulser. Although not shown, the lead 75 would got to a timing device, such as 74 of FIG. 3, which would also be connected to time the transfer switch 66 marked T/RTS in FIG. 4. The output of the T/RTS would then go through an amplifier 70, through a detector 67 to the transmission channel 72 of the cable 20 as shown in FIG. 3.

Figure 5:
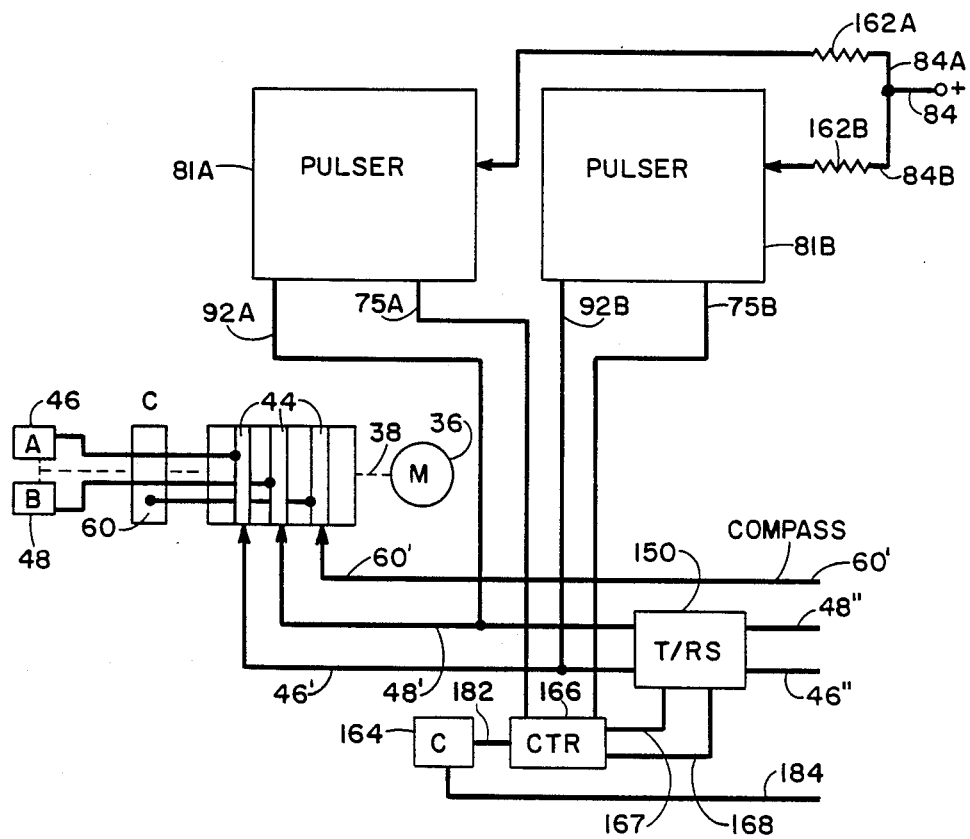
FIG. 5 is an extension of FIG. 3, illustrating the use of multiple pulsers, one for each of the separate T/RTS so that parallel output scan signals are provided simultaneously.

Earlier it was pointed out that any number of T/RTS, as desired, can be provided on the rotating assembly although only two were shown in FIG. 3 and only a single pulser was shown. In FIG. 5 a similar circuit is provided in which separate pulsers 81A and 81B are provided so that each of the T/RTS can be operated separately from the others.

In FIG. 5 each of the pulsers 81A and 81B are supplied by power from the supply 84 through separate leads 84A, 84B, and through separate resistors 162A and 162B. The timing signal comes from the counter 166, which is supplied with a clock signal from a clock 164 through the line 182. The counter, or control 166 also provides another signal output on leads 167 and 168 to the transmit/receive switch 150. The switch 150 disconnects the output leads 48" and 46" whenever the pulser signal is on the leads 46' and 48', which are connected through slip rings to the two transducers T/RTS 46 and 48 respectively.

Thus, with the apparatus of FIG. 5, two simultaneous sonic signal transmissions are being carried on, and the received signals are being transmitted through lines 48" and 46". The signals on these output lines can go directly to the cable if there are two separate transmission means However, they can be combined, as will be described in connection with FIGS. 7 and 8B if there is only a single transmission system in the cable. As also shown in FIG. 3, and as fully explained in the prior art and in my co-pending application, Ser. No. 242,497, a compass, preferably a direct reading compass, such as a flux gate compass, for example, or other available compasses provides a signal pulse on output line 60' whenever the scanning T/RTS crosses a line directed to the north. The pulsers are timed so that the transmission pulses to the multiple T/RTS are synchronized.

This application is devoted to the processing of multiple scan signals, their transmission to the surface, and their handling at the surface. Since their transmission involves the logging cable, it might be desirable to look at the subject of the cable, which is the only means of communication between the sonde and the surface.

The logging cables that are utilized for operating the borehole televiewer are generally the same cables that are used for many other types of sensing apparatus, which are used for the logging boreholes and for the detection of various properties of the subsurface formations. In the logging of electrical resistivity, self-potential, and other types of electrical phenomena, the signals are of much lower frequency than they are in the borehole televiewer. A cable with an ordinary conductor pair for transmitting the signals is fully adequate. It is generally believed that the commercial logging cables in use at the present time, which may be from 20,000 to 30,000 feet in length, will adequately handle signals in the range of 50 to 100 kilohertz (KHZ) or kilobits per second.

The desired resolution of the scan signals that are transmitted to the surface may be set down as the following: In the measurement of caliper or the distance of penetration of the sonic signals through mud and the rock wall of the borehole, the minimum resolution desired would be to 0.05", and 256 units of this would cover a radial distance of penetration of about 13 or 14".

In the measurement of azimuth the conventional timing is for 360 transmission pulses in a rotation of 360° giving a minimum angular resolution of 1°. In the measurement of signal amplitude, a six-bit digital value for amplitude would indicate a minimal resolution of about 1½%.

To transmit the scan signals with these minimum resolutions would take $256 \times 360 \times 6 \times 3$ (revolutions per second) or 1.6 million bits per second. With such a high data rate, it would obviously be impossible to transmit a complete sonic scan signal by digital transmission, although digital transmission would provide more precise amplitude transmission. While there are available in industry high frequency transmission channels, such as coaxial cables and fiber optic channels, these are not generally available today in logging service. In the future it is very likely that they will be available, in which case the data rates could be much higher, such as would adequately handle complete scan signal digital transmission.

In my co-pending application Ser. No. 242,497, I pointed out that there is distinct advantage in having multiple T/RTS, such as two T/RTS, of different frequencies. If one T/RTS is in the high frequency range, and the other in a lower frequency range, the precision of amplitude measurements at short distances from the transmitters would be available with the high frequency unit, and a greater depth of penetration into the rock would be available with the low frequency transducers.

One method of handling this type of signal would be to first delay one with respect to the other, until the two scan signals are in phase, and then gate the high frequency scan signal for a certain selected time interval, and then the lower frequency scan signal. By this means, a single analog signal can be transmitted over the present cables very satisfactorily and still utilize the benefit of two T/RTS.

Another way of utilizing the present cables effectively with more than one T/RTS is to process the analog scan signals in the sonde to determine the amplitudes of the reflected signals, and the corresponding radius or caliper, at the time of the return signal. These two quantities can be expressed digitally in a relatively few bits, so that as many as four such pairs of signals could be transmitted sequentially, as by multiplexing, over the existing single analog transmission circuit in the conventional cables.

One type of present logging cable utilizes seven conductors, of which two would be utilized for the transmission channel and the other four would be used for control, power supply, etc. However, it could be possible to use four of the conductors to provide two separate conductor pairs for analog transmission of the scan signals. If there are two analog transmission channels, two ESS from two T/RTS could be transmitted to the surface independently and simultaneously, as analog signals, in the conventional manner. Or the two transmission channels could provide for transmission of eight separate scan signals when processed to transmit only the amplitude of the reflected signal and the time of the reflected signal. With a pair of T/RTS of different frequencies, the amplitude of the high frequency reflection and caliper of the low frequency reflection could be combined for transmission.

Of course, where the multiple T/RTS are in the same horizontal plane and spaced circumferentially on the rotating assembly, they can individually be delayed in time until they are all in phase, and they can then be stacked to provide a signal of improved signal-to-noise ratio.

Another combination which would be very useful would be to provide two analog transmission circuits and to use two identical T/RTS on the rotating assembly, so that at the surface there would be two scan signals per revolution of the rotating assembly, and thus a shorter vertical spacing between scans on the display could be provided. Conversely, the sonde could be moved vertically at twice the normal logging rate, and still provide the precisely same log that would have been provided with the slower vertical logging rate, and a single T/RTS. Thus, by using two or more identical T/RTS, it would be possible to increase the rate of logging with the borehole televiewer by a factor of two, or three, or more, depending upon the number of T/RTS. This would provide a consequent cut in the time for providing a log. Since one of the major components of the cost of logging is for the idle rig time, this could be cut in half if two T/RTS were used, and so on.

What has been described so far is similar to material in my co-pending application, Ser. No. 242,501, and is provided as background information for what is to follow.

Figure 6:
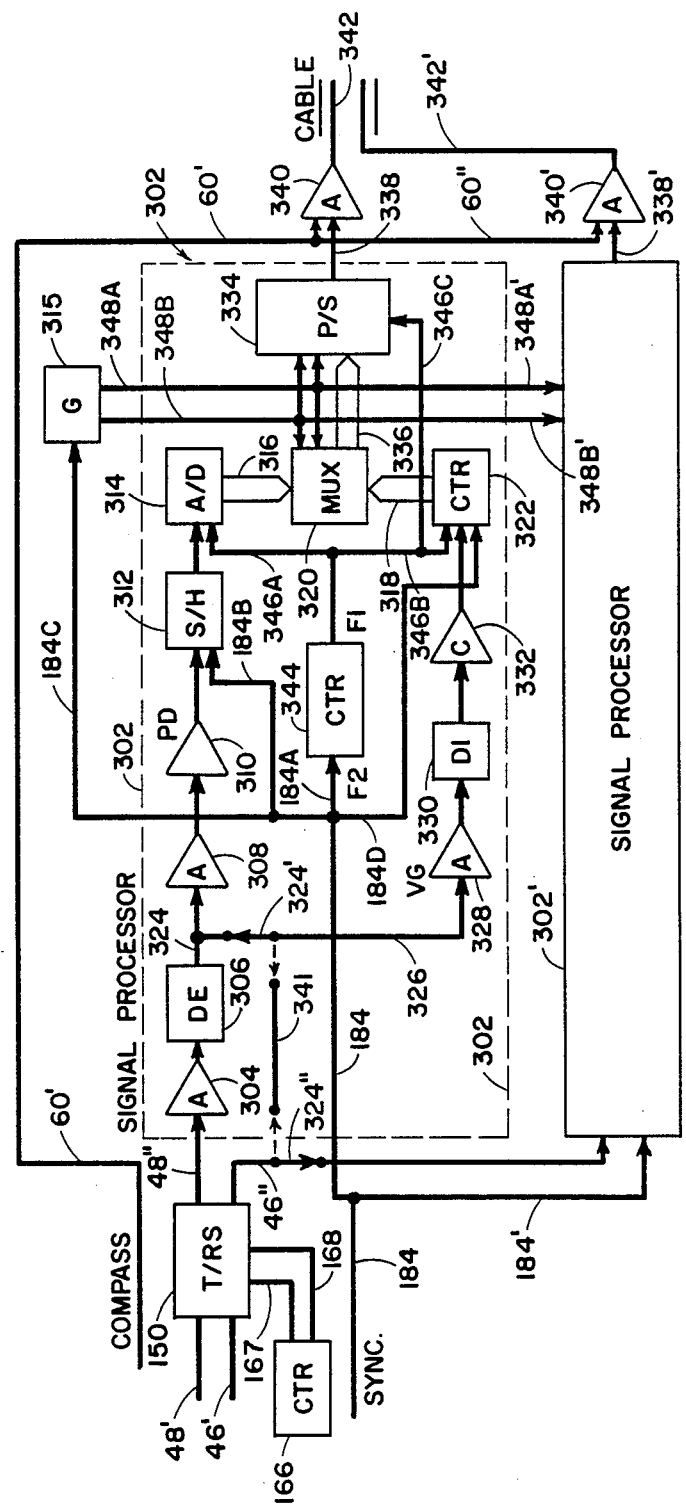
FIG. 6 illustrates an apparatus for providing separate digital signals comprising the amplitude of a reflection, and the time of travel, or distance of penetration, and multiplexing the two digital signals.

Referring now to FIG. 6, there are shown two channels for processing of the ESS. The inputs are taken from the output portion of FIG. 5 and shows two output signals 48" and 46"from the T/RS 150. One of these goes to the dashed box 302, and the other goes to the box 302', which is identical in all respects to the box 302. However, none of the internal detail of 302' is shown, since it would be identical to that shown in he dashed box 302.

Following the signal on lead 48" from the T/RS 150, the signal is amplified at amplifier 304 and detected at the box DE, 306. Since the received signal is generally a very high frequency electrical signal, it is necessary to process this signal to provide the envelope, which is a lower frequency unidirectional analog signal. The detected signal is the one which is conventionally transmitted to the surface. The detector 306 is a conventional part of the present-day televiewer and forms no part of this invention.

The detected signal on line 324 goes back to the "amplitude" channel, to amplifier 308, and peak detector 310. This peak detector determines the highest amplitude of the received signal, and the sample-and-hold 312 makes a temporary record of the amplitude of the signal. This peak amplitude that is sampled, now goes to an analog-to-digital converter 4, which measures the amplitude to six binary bits, and this digital number is transmitted through lines 316 to the multiplexer 320.

At the same time, the signal on line 324 also goes to the detector 306 and to the "caliper" channel, by line 326. This starts with a variable gain amplifier 328. The need for this arises from the fact that the received signal becomes weaker and weaker, depending on how far it has travelled into and out of the rock wall. Consequently, the signal is amplified in an amplifier that provides increasing gain or amplification, with increasing time of travel of the pulse and its reflection. Thus, even at the remote end of its path, the amplitude of the reflection from a flaw or obstacle, will be large enough to be measured.

In the method of determining the precise time of arrival, the amplified signal from 328 goes to a differentiator 330, and to a comparator 332.

The counter 344 is controlled by the sync signal on line 184. The counter provides two different frequencies F1 and F2. The high frequency F1 controls the digitizer 314 and the counter 322. The lower frequency F2 controls the multiplexer 320, which controls the two six bit signals on input lines 316 and 318. The lines 316 carry the six bit signal from the A/D converter 314. The six bit lines 318 bring the signal from the counter 322, which has counted the time to the reflection in terms of digital bits.

Thus there is on one channel, line 324, a measure of the "amplitude" of the signal and on the other channel, line 326, a measure of the time of travel, or caliper. These two six bit binary numbers then are passed sequentially to a parallel-to-serial converter. Here the parallel words of six bits are converted to serial words of six bit, and transmitted to line drive amplifier 340 and to cable channel 342.

The multiplexing is done by alternately sampling one or the other of the boxes 314 and 322, corresponding to each of the separate initiations of the sonic signal. So for each transmission resulting from the pulsers of FIG. 5, there is obtained two six bit binary numbers which are alternately transmitted through the parallel-serial (P/S) converter to the cable 342. The switching is accomplished by means of the gate control apparatus 315 over leads 348A and 348B. Also, if a second scan signal is being provided over line 46" to the signal processor 302', the same switch or gate means 315 is also supplied by mean of leads 348A' and 348B'.

The compass signal comes in on line 60' from the compass 60 as shown in FIG. 5, and goes into the amplifier 340, and also through lead 60" to the amplifier 340', which amplifies the output of the second signal processor, and goes by lead 342' to the cable. As shown, there are two transmission channels 342 and 342', each handling the output of a different T/RTS.

Consider again the signal processor in the dashed box 302. If there is a single scan signal on input line 48", this signal breaks two ways--one through the amplitude branch, and one through the caliper branch. In one mode of operation both measurements of amplitude and caliper are made on the same transducer ESS. As will be discussed in connection with FIGS. 8A and 8B and in my co-pending application, Serial No. 242,501, with the use of two T/RTS, one of high frequency and one of low frequency, the two ESS can be combined into a composite scan signal, which, in the early part is recorded by the high frequency T/RTS, and in the later part is recorded by the low frequency T/RTS.

It will be clear, therefore, that in a second mode of operation, using a composite ESS, that the amplitude channel can provide amplitude information from the early part, and caliper information from the later part.

In a third mode of operation a first pair of measurements of amplitude and caliper are made from the early part. The measuring parts of FIG. 6 are then reset, and the operation is repeated again in the later part of the composite ESS.

Thus it is contemplated in the use of two transducers, one of high frequency to provide amplitude at the first reflector, the wall of the borehole, and a lower frequency one to provide the time of travel of the caliper. By use of switches 324' in line 326, and 324" in line 46", with connector 341, it is possible to utilize a high frequency transducer on line 46" so that the caliper measurement in the processor 302 would correspond to the caliper of the lower frequency transducer while the amplitude would be corresponding to the higher frequency transducer.

In my co-pending application, Ser. No. 242,501, I pointed out that by use of gating means, a high frequency and a low frequency transducer could be gated sequentially onto a single transmission channel and thus, such a composite signal on 48″ would provide, without the switches 324′ and 324″ the amplitude and caliper measurements respectively from both transducers.

In FIG. 6 I have shown a pair of switches 324′ and 324″. With the switches as shown, a single ESS on lead 48″ could be connected to both the amplitude and caliper channels 324,326 of processor 302. In another mode of operation, switch 324′ is moved to lead 341, as is also switch 324′, so that the ESS on 46″ goes to the caliper channel while 48″ goes to the amplitude channel of the processor 302.

While I illustrate in FIG. 5 a processor that would transmit and receive two sonic signals from two transducers 46 and 48 respectively, it will be obvious that the same apparatus can be used with a transmit/receive switch 150′ (FIG. 7) to handle three, four or more separate signals as it does the two signals on leads 46′ and 48′. Also, each of these single transducers can be combined as previously mentioned, so that two transducers together provide one pair of signals of amplitude and caliper. Thus, to transmit four such signals in digital form on a single transmission line it could utilize eight separate transducers, four of high frequency and four of low frequency, and so on.

Also, I have shown in FIG. 6 that two separate transducers providing signals on lines 48″ and 46″ could each be composed of the gated scan signals from a pair of high and low frequency transducers.

Figure 7:
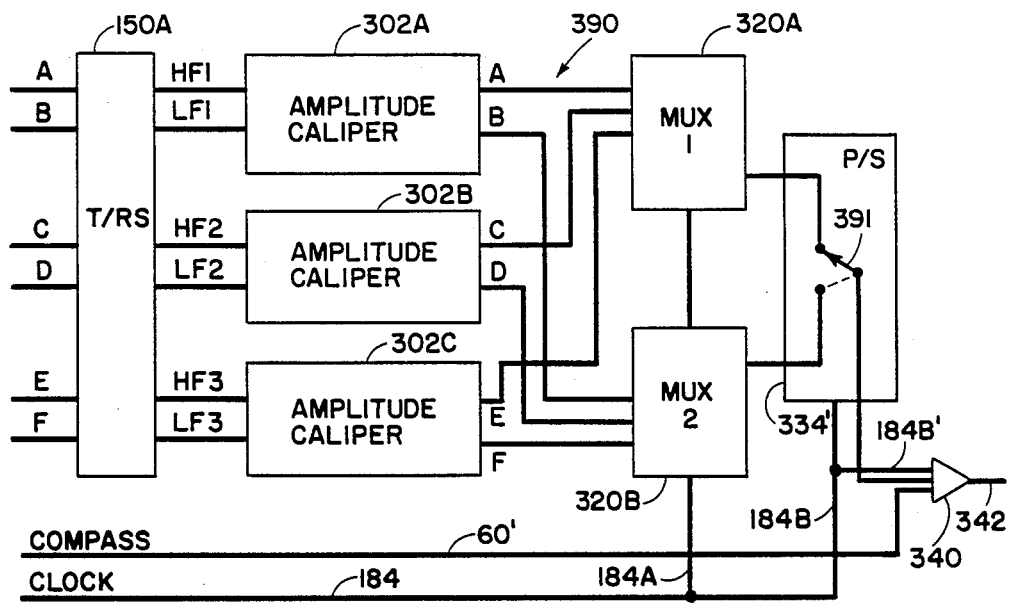
FIG. 7 illustrates an extension of FIG. 6, in which plural digital signals of amplitude and caliper from plural ESS are multiplexed and transmitted over a single transmission channel.

Referring now to FIG. 7, there is shown a modification of FIG. 6. Briefly, six T/RTS are shown and indicated by letters A, B, C, D, E, and F. These all lead into a transmit/receive switch 150A that controls all of the reflected signals on the leads which are identified by the indication HF1, LF1, HF2, LF2, HF3, and LF3, etc. In other words, there are six or more transducers, three of them high frequency, which produce measurements of amplitude, as shown in the amplitude line of 302. The other three transducers are low frequency, and they will pass through circuits corresponding to the caliper line of box 302 of FIG. 6.

Since the amplitude signals are taken from the short range transmission, that is, from the wall of the borehole, they will all be multiplexed together by MUX1, 320A. All of the low frequency signals of caliper will be multiplexed in 320B. All of the signals coming into the multiplexer 320A and 320B are now digital. They are controlled by the clock signal on 184, which goes by lead 184A to the two multiplexers. This timing signal also goes to the parallel-to-serial converter 324′.

The P/S converter does two things, it stores each of the six signals coming from the two multiplexers and reads out the bits in serial order. Also by means of a switch 391 it reads all of the signals from multiplexer 1 and then switches over and reads them from multiplexer 2, then 1, and so on. Of course, the three pairs of signals can be read out and transmitted in other combinations. The output of the P/S converter then goes to the amplifier and line driver 340 and to a single transmission channel 342 in the cable 20.

While FIG. 7 shows that two separate T/RTS, such as HF1 and LF1 together provide one pair of data, the 6 T/RTS shown would not even fully load a single transmission channel Another way of handling the individual T/RTS would be as indicated in FIG. 6 where the jumper lead 341 is not connected, and both the amplitude and caliper channels process the signal from a single T/RTS. That is, the signal from 48″ goes to both lines 324 and 326 and another signal from T/RTS 46 goes by line 46″ to the second processor 302′. In this format, only 4 T/RTS can be handled on one transmission channel.

Figure 8A:
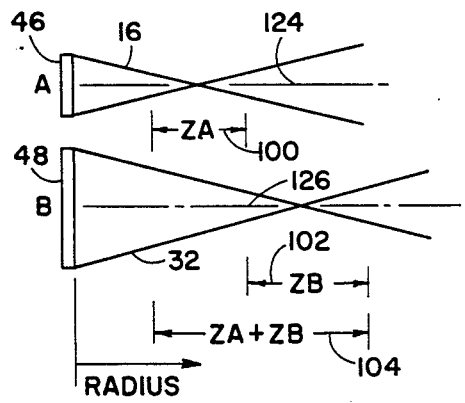
Figure 8B:
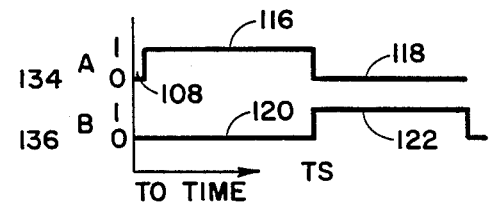
FIG. 8B illustrates how the two T/RTS shown in FIG. 8A are gated.

Refer now to FIGS. 8A and 8B, which are taken from my co-pending application, Ser. No. 242,501. There are shown two T/RTS 46 and 48. One 46 is a high frequency transducer (possibly in the range of 0.75 to 1.25 MHZ), while 48 would be a lower frequency transducer (possibly in the range of 250 KHZ to 850 KHZ). They transmit beams of sonic information 16, and 32 respectively. It is well known that the higher frequency beam has a shorter distance of penetration in a liquid or solid medium. Correspondingly, lower frequency beams have a greater distance of penetration.

The best range of usefulness of the high frequency T/RTS is ZA, 100, while for the lower frequency T/RTS the best range is ZB. Thus, by using both, a much greater range of usefulness is provided, ZA+ZB. FIG. 8B shows the gating time schedule in which the first gate 116 on line 134 passes the high frequency ESS from TO to TS, and then the second gate 122 on line 136 passes the low frequency ESS from time TS onward.

While not shown, the multiple pairs of digital numbers transmitted from FIG. 7, go by conductor 342 to the surface, along with the clock signal to the multiplexers 32A, 32B on lead 184B′. At the surface the digital signals are demultiplexed, converted to analog signals and stored or displayed.

While I have shown and described methods and apparatus for processing multiple ESS so as to permit transmission of multiple ESS over presently available low frequency transmission channels to the surface, these signals could of course be transmitted to the surface without processing, where the cable provides single or multiple high frequency channels, and the same processing done at the surface. The point being that the processing is important in the utilization of the multiple ESS, whether done in the sonde, or at the surface. It is also important as a basis for transmission over low frequency channels. So, when I speak of processing ESS I mean either processing in the sonde or at the surface, as appropriate.

While the invention has been described with a certain degree of particularity, it is manifest that many changes may be made in the details of construction and the arrangement of components without departing from the spirit and scope of this disclosure. It is understood that the invention is not limited to the exemplified embodiments set forth herein but is to be limited only by the scope of the attached claim or claims, including the full range of equivalency to which each element thereof is entitled.

What is claimed is:
1. A method of logging a borehole which comprises:
(a) carrying out scanning operations around the wall of said borehole by directing sonic energy in a radial plane around the wall of said borehole and receiving returned reflected energy from reflecting surfaces and producing at least a first and a second scan signal representative of amplitude and travel time of reflected signals from reflecting surfaces at each of a plurality of downhole locations spaced around the wall of said borehole, in which the two scan signals are of different frequencies;
(b) processing said at least two scan signals representative of amplitude and travel time of reflected signals from reflecting surfaces in preparation for transmission by combining said two scan signals after one of said two scan signals is delayed until said at least two scan signals are time coincident;

(c) transmitting said processed scan signals representative of amplitude and travel time of reflected signals from reflecting surfaces over said signal channel to the surface; and (d) utilizing at the surface said transmitted processed signals representative of amplitude and travel time of reflected signals from reflecting surfaces.

2. The method as in claim 1 in which the step of delaying comprises the sequential steps of:
  (a) digitizing said one scan signal;
  (b) delaying said digitized scan signal; and
  (c) converting said delayed digitized scan signal to an analog signal.

3. The method as in claim 2 in which said step of combining comprises combining a selected portion of one scan signal with a selected portion of said second scan signal.

4. A method of logging a borehole which comprises:
  (a) carrying out scanning operations around the wall of said borehole by directing sonic energy in a radial plane around the wall of said borehole and receiving returned reflected energy from reflecting surfaces and producing at least a first and a second scan signal representative of amplitude and travel time of reflected signals from reflecting surfaces at each of a plurality of downhole locations spaced around the wall of said borehole, in which the two scan signals are of different frequencies;

(b) processing said at least two scan signals representative of amplitude and travel time of reflected signals from reflecting surfaces in preparation for transmission by combining said two scan signals after one of said two scan signals is delayed until said at least two scan signals are time coincident, wherein the step of delaying comprises the sequential steps of digitizing said one scan signal, delaying said digitized scan signal, and converting said delayed digitized scan signal to an analog signal, and wherein the step of combining comprises combining a selected portion of one scan signal with a selected portion of said second scan signal by gating a first portion of one of the scan signals including a selected reflection, and then gating the latter portion of the other scan signal having a lower frequency including the portion after the selected reflection;

(c) transmitting said processed scan signals representative f amplitude and travel time of reflected signals from reflecting surfaces over a signal channel to the surfaced; and (d) utilizing at the surface said transmitted processed signals representative of amplitude and travel time of reflected signals from reflecting surfaces.

* * * * *